(12) United States Patent
Yoneda

(10) Patent No.: US 6,993,232 B2
(45) Date of Patent: Jan. 31, 2006

(54) WAVEGUIDE TYPE OPTICAL DEVICE AND MANUFACTURING METHOD THEREOF

(75) Inventor: Shigeru Yoneda, Tokyo (JP)

(73) Assignee: NEC Corporation, Tokyo (JP)

( * ) Notice: Subject to any disclaimer, the term of this patent is extended or adjusted under 35 U.S.C. 154(b) by 199 days.

(21) Appl. No.: 10/266,631

(22) Filed: Oct. 9, 2002

(65) Prior Publication Data
US 2003/0091263 A1 May 15, 2003

(30) Foreign Application Priority Data
Oct. 10, 2001 (JP) .............................. 2001-312611

(51) Int. Cl.
*G02B 6/10* (2006.01)

(52) U.S. Cl. ..................................... 385/129
(58) Field of Classification Search ................ 385/129, 385/147, 14
See application file for complete search history.

(56) References Cited

U.S. PATENT DOCUMENTS

| | | | | |
|---|---|---|---|---|
| 5,467,415 | A | * 11/1995 | Presby | 385/14 |
| 5,920,663 | A | 7/1999 | Dragone | 385/15 |
| 6,477,308 | B2 | * 11/2002 | Hattori et al. | 385/129 |
| 6,603,916 | B1 | * 8/2003 | McGreer et al. | 385/129 |
| 6,678,452 | B1 | * 1/2004 | Bloechl et al. | 385/129 |

FOREIGN PATENT DOCUMENTS

| | | |
|---|---|---|
| JP | 11-174251 | 7/1999 |
| JP | 2000-162452 | 6/2000 |
| JP | 2000-206348 | 7/2000 |
| JP | 2001-21743 | 1/2001 |
| JP | 2001-83345 | 3/2001 |
| JP | 2001-91767 | 4/2001 |
| JP | 2001-091864 | 4/2001 |
| JP | 2002-148571 | 5/2002 |

OTHER PUBLICATIONS

Japanese Office Action dated May 18, 2004, with partial English translation.

* cited by examiner

*Primary Examiner*—Thien M. Le
*Assistant Examiner*—April Taylor
(74) *Attorney, Agent, or Firm*—McGinn IP Law Group, PLLC

(57) ABSTRACT

An array waveguide diffraction grating 201 as waveguide type optical device comprises a planar lightwave circuit 203 with an optical waveguide layer 211 formed on a silicon substrate 212 and having a predetermined thickness $h_0$, a first compensation substrate 204 bonded to the side of the optical waveguide layer 211 and having a thickness $h_1$ and a second compensation substrate 205 formed on the silicon substrate 212 and having a thickness $h_4$. The linear expansion coefficients $\alpha_1$ and $\alpha_4$ of the two compensation substrates 204 and 205 are set to be greater than that of the optical waveguide element 203, and highly rigid adhesives are used as a first and a second adhesive 214 and 215. It is thus possible to have the contraction of the optical waveguide element 203 due to a temperature change increased with the first and second substrates, thus permitting the center frequency setting to a desired value in a predetermined temperature range. Similar effects are obtainable by merely providing a support substrate on the substrate side of the optical waveguide element 203.

14 Claims, 6 Drawing Sheets

WAVEGUIDE TYPE OPTICAL DEVICE AND MANUFACTURING METHOD THEREOF

BACKGROUND OF THE INVENTION

This application claims benefit of Japanese Patent Application No. 2001-312611 filed on Oct. 10, 2001, the contents of which are incorporated by the reference.

The present invention relates to waveguide type optical device used as filter device in such fields as optical communication and data processing using light and also to method of manufacturing the same. More specifically, the present invention relates to a waveguide type optical device permitting improvement of the yield in manufacture and also to method for manufacturing the same.

With spread of optical communication techniques and development of data processing techniques using light, optical waveguide elements have become in wide spread use as optical waveguide filters. Such optical waveguide elements permitting various functions by utilizing interference of light generally vary in refractive index and optical path length in dependence on the ambient temperature. Therefore, the pass bandwidth and center wavelength fluctuate with individual manufactured optical waveguide elements.

Accordingly, the center wavelength of optical waveguide elements including AWG (arrayed waveguides) is adjusted by using a Velch element or heater as a temperature controller such as to satisfy grid specifications prescribed in ITU (International Telecommunication Unison). For example, in a quartz system optical waveguide element, the center wavelength has a temperature dependency of about 0.1 nm/° C., and adjustment to a desired center wavelength is made by adjusting the preset temperature of a waveguide type optical device using such an optical waveguide element.

However, the center wavelength of manufactured optical waveguide elements or waveguide type devices incorporating such elements may not always be preset to a desired value in a temperature range adjusted by the above temperature controller. The optical waveguide elements and waveguide type optical devices, which are incapable of being temperature adjusted with the temperature controller, have heretofore become rejected products, and this has been a significant cause of the fact that the yield of manufactured elements or devices can not be improved.

SUMMARY OF THE INVENTION

An object of the present invention is to provide a waveguide type optical device capable of improving the yield when manufacturing waveguide type optical devices, with which a desired center wavelength is obtainable, irrespective of the difference of the temperature characteristics of individual optical waveguide elements.

According to a first aspect of the present invention, there is provided a waveguide type optical device comprising: a planar lightwave circuit; a support substrate disposed on the substrate side of the optical waveguide element and having a predetermined linear expansion coefficient greater than that of the substrate; and a temperature controller assembled in the support substrate and serving to control the temperature of the optical waveguide element.

In this aspect of the present invention, on the substrate side of the planar lightwave circuit a support substrate having a greater linear expansion coefficient than that of the substrate is disposed, and the temperature of the support substrate and the optical waveguide element is controlled with the temperature controller assembled in the support substrate. In the temperature control, the support substrate causes expansion and contraction of the optical waveguide element such as to substantially increase the linear expansion coefficient of the optical waveguide element. It is thus possible to control the center wavelength in a broader range, and this control is possible since a predetermined linear expansion coefficient is provided even when a desired center wavelength could not have been obtained in the case of using no support substrate having a great linear expansion coefficient. Thus, it is possible to improve the yield.

In a second aspect of the present invention, in the waveguide type optical device of the first, the substrate in the optical waveguide element and the support substrate are bonded to each other by highly rigid adhesive.

According to this aspect of the present invention, the optical waveguide element substrate and the support substrate are bonded together by using a highly rigid adhesive to let expansion and contraction of the support substrate to be efficiently transmitted to the optical waveguide element side.

According to a third aspect of the present invention, there is provided an waveguide type optical device comprising: a planar lightwave circuit; a first substrate disposed on the waveguide side of the optical waveguide element and having a linear expansion coefficient greater than that of the optical waveguide element; and a second substrate disposed on the side opposite the waveguide side of the optical waveguide element, provided with a temperature controller for adjusting the temperature of the optical waveguide element and having a linear expansion coefficient greater than that of the optical waveguide element.

According to this aspect of the present invention, the first and second substrates having a linear expansion coefficient greater than that of the planar lightwave circuit are disposed to sandwich the optical waveguide element to substantially increase the linear expansion coefficient of the optical waveguide element. It is thus possible to control the center wavelength of the optical waveguide element in a broader range and obtain a desired center wavelength. Thus, it is possible to obtain the desired center wavelength and hence improve the yield.

In a fourth aspect of the present invention, in the waveguide type optical device of the third aspect, a first adhesive used for bonding together the waveguide in the optical waveguide element and the first substrate and a second adhesive used for bonding together the substrate in the optical waveguide element and the second substrate are highly rigid.

According to this aspect of the present invention, the optical waveguide element substrate and the support substrate are bonded together by using a highly rigid adhesive to let expansion and contraction of the support substrate to be efficiently transmitted to the optical waveguide element side.

In a fifth aspect of the present invention, in the waveguide type optical device of the fourth aspect, the linear expansion coefficient of the first substrate is selected to a value such as to reduce the warping of the whole structure, obtained by disposing the second substrate to the substrate side of the optical waveguide element, with temperature changes.

According to this aspect of the present invention, with the planar lightwave circuit sandwiched between the first and second substrates having a linear expansion coefficient greater than its linear expansion coefficient, these linear expansion coefficients are set adequately to preclude warping with temperature changes that would take place in the case of bonding only one substrate to the optical waveguide element.

In a sixth aspect of the present invention, the waveguide type optical device of the third aspect further comprises: a fiber array optically coupled to the optical waveguide element; and reinforcement glass 209 disposed on the waveguide side of the optical waveguide element as shown in FIG. 1 and serving to reinforce the bonding strength of the fiber array; the first substrate having a thickness equal to or less than the thickness of the reinforcement glass 209.

According to the sixth aspect, with the first substrate disposed on the waveguide side of the optical waveguide element in the waveguide type optical device total thickness of the device may be increased. On the contrary, in this aspect, because of the presence, on the waveguide side, of the reinforcement glass 209 for reinforcing the bonding strength of the fiber array, the increase of the overall thickness is prevented by setting the thickness of the first substrate to be equal to or less than the thickness of the reinforcement glass 209.

In a seventh aspect of the present invention, in the waveguide type optical device of the first aspect the support substrate and the temperature controller are substantially equal in thickness.

According to this aspect, with the support substrate and the temperature controller made substantially equal in thickness, it is made possible to manufacture the waveguide type optical device having a thickness substantially equal to the thickness in the case of the waveguide type optical device, in which the temperature controller essential on the substrate side of the optical waveguide element is used.

In an eighth aspect of the present invention, in the waveguide type optical device of the third aspect the second substrate and the temperature controller are substantially equal in thickness.

According to this aspect, like the waveguide type optical device as set forth in claim 1, the waveguide type optical device can be manufactured with a thickness which is substantially equal to the overall thickness of the waveguide type optical device, the essential temperature controller is used on the substrate side of the optical waveguide element.

In a ninth aspect of the present invention, in the waveguide type optical device of the third aspect the first and second substrates are substantially equal in thickness and linear expansion coefficient.

According to this aspect, the simplest selection standards of the first and second substrates bonded to the opposite side of the optical waveguide element are specified. By using, as the first and second substrates, those which are entirely the same in specifications and have a linear expansion coefficient than that of the optical waveguide element, warping is hardly generated so long as warping of the optical waveguide element is hardly generated. It is thus possible to increase only the expansion/contraction factor of the optical waveguide element. Besides, since it is possible to provide common specifications to the first and second substrates, it is possible to realize cost reduction and readier parts management.

According to a tenth aspect of the present invention, there is provided a method of manufacturing a waveguide type optical device comprising: an element preparation step of preparing an optical waveguide element; a checking step for checking whether the center wavelength of the prepared optical waveguide element can be set to a predetermined value under temperature control in a predetermined temperature range; and a bonding step of bonding, to the substrate side of an optical waveguide element having judged in the checking step to be incapable of setting the desired value, a support substrate having a predetermined linear expansion coefficient greater than that of the substrate itself of the optical waveguide element.

According to this aspect, a method of manufacturing the waveguide type optical device according to the present invention as set forth in claim 1 is shown. First, in the element preparation step the optical waveguide element is prepared. Then, in the checking step a check is made as to whether the center wavelength of individual optical waveguide elements can be set to the desired value under temperature control in the predetermined temperature range. In the prior art, it was inevitable to discard those which are found in the checking step to be incapable of setting the center wavelength to the desired value, as rejected parts. According to this aspect of the present invention, in the bonding step to the optical waveguide element, judged in the checking step to be incapable of setting the center wavelength to the desired value is bonded a support substrate having a predetermined linear expansion coefficient greater than that of the substrate itself of the optical waveguide element, thus permitting the use of the resultant element as waveguide type optical device.

According to an eleventh aspect of the present invention, there is provided a method of manufacturing a waveguide type optical device comprising: an element preparation step of preparing an optical waveguide element; and a bonding step for bonding, to the substrate side of optical waveguide element prepared in the element preparation step, a support substrate having a predetermined linear expansion coefficient greater than that of the substrate itself of the optical waveguide element.

In this aspect, a different method of manufacturing the waveguide type optical device according to the present invention as set forth in claim 1 is shown. First, in the element preparation step the optical waveguide element is prepared. In the bonding step, to the substrate side of the prepared optical waveguide element is bonded a support substrate having a predetermined linear expansion coefficient greater than that of the substrate itself to the optical waveguide element, thus permitting the use of the resultant element as waveguide type optical device. This aspect of the present invention is different from the aspect of the present invention as set forth in claim 10 in that to the substrate side of the optical waveguide element is non-conditionally bonded the support substrate having the predetermined linear expansion coefficient greater than that of the substrate itself of the optical waveguide element.

In a twelfth aspect of the present invention, in the method of manufacturing the waveguide type optical device of the tenth or eleventh aspect, the adhesive used for bonding in the bonding step is highly rigid when hardened.

According to the aspect, a highly rigid adhesive is used in the bonding step to permit the expansion and contraction of the support substrate to be efficiently transferred to the optical waveguide element side.

According to a thirteenth aspect of the present invention, there is provided a method of manufacturing a waveguide type optical device comprising: an element preparation step of preparing an optical waveguide element; a checking step for checking whether the center wavelength of the prepared optical waveguide element can be set to a desired value under temperature control in a predetermined temperature range; a first substrate bonding step of bonding, to the waveguide side of an optical waveguide element judged in the checking step to be incapable of setting the desired value, a first substrate having a linear expansion coefficient greater than that of the substrate itself of the optical waveguide element; and a second step of bonding, to the substrate side of the optical waveguide element judged in the checking step to be incapable of setting the desired value, a second substrate having a linear expansion coefficient greater than that of the substrate itself of the optical waveguide element.

According to this aspect, a method of manufacturing the waveguide type optical device according to the present invention as set forth in claim 3. First, in the element preparation step the optical waveguide element is prepared. Then in the checking step, the prepared optical waveguide element is checked as to whether the center wavelength of the optical waveguide element can be set to the desired value under temperature control in the predetermined temperature range. In the prior art, it is inevitable to discard as rejected parts those optical waveguide elements which are judged in the checking step to be incapable of setting the center wavelength to the desired value.

According to this aspect, in the first substrate bonding step to the waveguide side of the optical waveguide element judged in the checking step to be capable of setting the center wavelength to the desired value is bonded the first substrate having the linear expansion coefficient greater than that of the substrate itself of the optical waveguide element. Also, in the second substrate bonding step to the substrate side of the optical waveguide element judged in the checking step to be incapable of setting the center wavelength to the desired value is bonded the second substrate having the greater linear expansion coefficient than that of the substrate itself of the optical waveguide element. Thus, the waveguide type optical device with the bonded first and second substrates can be used like other waveguide type optical devices.

According to a fourteenth aspect of the present invention, there is provided a method of manufacturing a waveguide type optical device comprising: an element preparation step of preparing an optical waveguide element; a first substrate bonding step of bonding, to the waveguide side of the optical wave guide element prepared in the element preparation step a first substrate having a linear expansion coefficient greater than that of the substrate itself of the optical waveguide element; and a second step of bonding, to the substrate side of the optical waveguide element prepared in the element preparation step a second substrate having a linear expansion coefficient greater than that of the substrate itself of the optical waveguide element.

According to this aspect, a method of manufacturing the waveguide type optical device according to the present invention as set forth in claim 3 is shown. First, in the element preparation step the optical waveguide element is prepared. Then in the first substrate bonding step to the waveguide side of the prepared optical waveguide element is bonded the first substrate having the greater linear expansion coefficient than that of the substrate itself of the optical waveguide element. Also, in the second substrate bonding step to the substrate side of the optical waveguide element prepared in the element preparation step is bonded the second substrate having the greater linear expansion coefficient than that of the substrate itself of the optical waveguide element. Thus, the waveguide type optical device with the bonded first and second substrates can be used like other waveguide type optical devices. The first or the second substrate bonding step may be executed first, or both the steps may be executed at a time.

In a fifteenth aspect of the present invention, in the method of manufacturing the waveguide type optical device of the thirteenth or fourteenth aspect, the first and second substrates are substantially equal in thickness and linear expansion coefficient.

According to this aspect, the simplest method of selecting the first and second substrates to be bonded to the opposite sides of the optical waveguide element is shown. By using as the first and second substrates those of the same specifications and having linear expansion coefficient greater than that of the optical waveguide element, no warping is generated so long as warping of the optical waveguide element is hardly generated, thus permitting increase of the sole expansion/contraction factor of the optical waveguide element. Besides, since it is possible to provide common specifications to the first and second substrates, it is possible to realize cost-down and easier parts management.

According to a sixteenth aspect of the present invention, there is provided a method of manufacturing a waveguide type optical device comprising: an element preparation step of preparing an optical waveguide element; a temperature measuring step of measuring a temperature, at which the center wavelength of the prepared optical waveguide element is set to a desired value; a support substrate linear expansion coefficient selecting step of selecting the extent, by which the linear expansion coefficient of the support substrate to be bonded to the substrate side of the optical waveguide element is greater than that of the substrate in the optical waveguide element, on the basis of the temperature measured in the ideal temperature measuring step; and a bonding step of bonding, to the substrate side of the optical waveguide element, a support substrate having the linear expansion coefficient selected in the support substrate linear expansion coefficient selecting step.

According to this aspect, after preparation of the optical waveguide element in the element preparation step, the temperature, at which the center wavelength of the prepared optical waveguide element is set to the desired value, is measured. Then in the support substrate linear expansion coefficient selecting step, according to the measured temperature it is selected the extent, by which the linear expansion coefficient of the support substrate to be bonded to the substrate side of the optical waveguide element is greater than that of the optical waveguide element. It is thus possible to prepare a plurality of support substrates having different linear expansion coefficients and select the most adequate support substrate.

According to a seventeenth aspect of the present invention, there is provided a method of manufacturing a waveguide type optical device comprising: an element preparation step of preparing an optical waveguide element; a temperature measuring step of measuring a temperature, at which the center wavelength of the prepared optical waveguide element is set to a desired value; a first/second substrate linear expansion coefficient selecting step of selecting the extent, by which the linear expansion coefficient of the first substrate to be bonded to the waveguide side of the optical waveguide element and the liner expansion coefficient of the second substrate to be bonded to the substrate side of the optical waveguide element are greater than that of the substrate of the optical waveguide element, on the basis of the temperature measured in the ideal temperature measuring step; and bonding step of bonding the first and second substrates with the linear expansion coefficient selected in the first/second substrate linear expansion coefficient selecting step to corresponding parts of the optical waveguide element.

According to this aspect, first in the element preparation step the optical waveguide element is prepared. Then, in the ideal temperature measurement step the temperature, at which the center wavelength of the prepared optical waveguide element is set to the desired value, is measured. On the basis of the measured temperature, the extent is selected, by which the linear expansion coefficient of the first substrate to be bonded to the waveguide side of the wavelength element and the linear expansion coefficient of the second substrate to be bonded to the substrate side of the optical waveguide element are greater than that of the substrate of the optical waveguide element. Then the first and second substrates having the linear expansion coefficients selected in the first/second substrate linear expansion coefficient selecting means are bonded to corresponding parts of the optical waveguide element. Thus, it is possible to prepare first and second substrates having different linear expansion coefficients and select the most adequate support substrate.

Other objects and features will be clarified from the following description with reference to attached drawings.

PREFERRED EMBODIMENTS OF THE INVENTION

Preferred embodiments of the present invention will now be described with reference to the drawings.

The principal construction according to the present invention will now be described.

Figure 1:
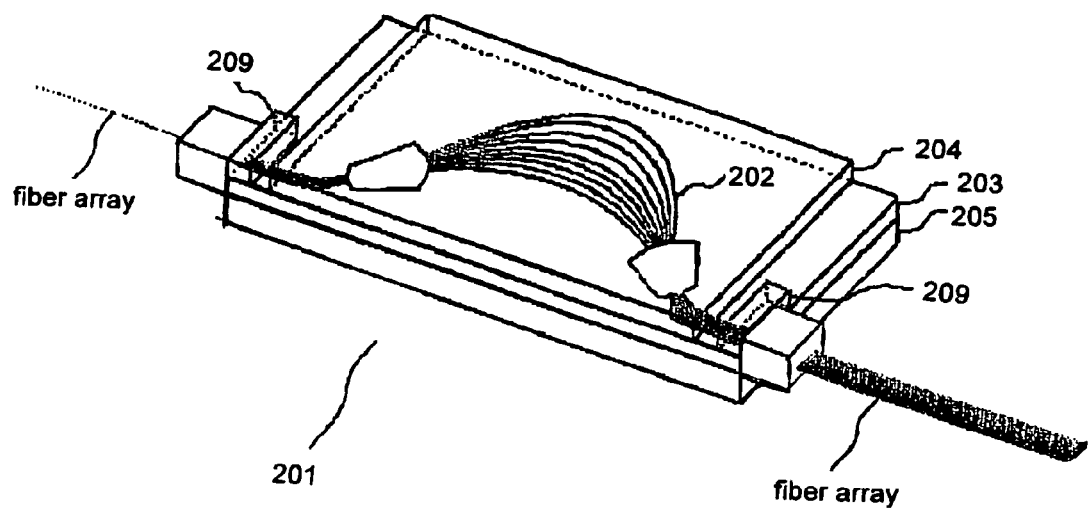
FIG. 1 shows an array waveguide diffraction grating as a waveguide type optical device, to which the present invention is applied.

FIG. 1 shows an array waveguide diffraction grating as a waveguide type optical device, to which the present invention is applied. The array waveguide diffraction grating 201 comprises a optical waveguide element 203 with an optical waveguide pattern 202 formed therein and a first and a second compensation substrate 204 and 205 sandwiching the optical waveguide element 203 from the opposite sides thereof.

Usually, the temperature dependency of the center wavelength of the optical waveguide can be represented by the following formula (1).

$$\frac{d\lambda_0}{dT} = \frac{\lambda_0}{n_{eq}} \cdot \left(\frac{1}{L}\frac{dS}{dT}\right) \quad (1)$$

In this formula (1), $\lambda_0$ is the center wavelength, $n_0$ is the equivalent refractive index of the optical waveguide, and $1/L \cdot ds/dT$ is the optical length temperature coefficient. The optical length temperature coefficient can be given by the following formula (2).

$$\frac{1}{L}\frac{dS}{dT} = \frac{dn_{eq}}{dT} + n_{eq}\alpha \quad (2)$$

In this formula (2), $\alpha$ is the linear expansion coefficient of the optical waveguide. The linear expansion coefficient $\alpha$ can be usually approximated by the linear expansion coefficient of the substrate material. From the formulas (1) and (2), it is seen that the temperature dependency of the center wavelength of the waveguide type optical device can be varied by adjusting the linear expansion coefficient of the substrate.

Figure 2:
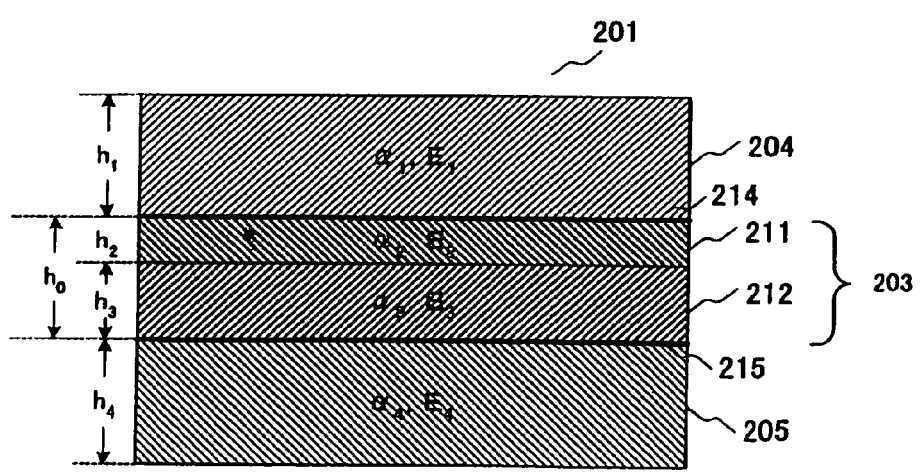
FIG. 2 shows the sectional structure of the array waveguide diffraction grating, to which the present invention is applied.

FIG. 2 shows the sectional structure of the array waveguide diffraction grating, to which the present invention is applied. The array waveguide diffraction grating 201 includes a planar lightwave circuit 203, which is constituted by a silicon substrate 212 and an optical waveguide layer 211 formed thereon and has a predetermined thickness $h_0$, a first compensation substrate 204 bonded to the optical waveguide 211 and having a thickness $h_1$, and a second compensation substrate 205 bonded to the silicon substrate 212 and having a thickness $h_4$. The optical waveguide element 203 is constituted by an optical waveguide layer 211 having a thickness h2 and a silicon substrate 212 having a thickness $h_3$. The optical waveguide layer 211 and the first compensation substrate 204 are bonded to each other by first adhesive 214. The silicon substrate 212 and the second compensation substrate 205 are bonded to each other by a second adhesive 215.

The first and second adhesives 214 and 215, unlike the prior art adhesive used for bonding the silicon substrate 212 and the other substrate to each other, are highly rigid adhesives. In the prior art, a material having low rigidity and capable of undergoing expansion and contraction to a certain extent was used as adhesive from the consideration that the difference expansion and contraction of two substrates having different linear expansion coefficients should have as little effect as possible on opposite side substrates. According to the present invention, adhesives are used from quite opposite standpoint such that the expansion and contraction of one of the two substrates efficiently have effects on the other.

The linear expansion coefficients and Young's modulus of the individual layers of the array waveguide circuit diffraction grating 201 are defined as follows. The linear expansion coefficient and the Young's modulus of the uppermost first compensation substrate 204 in the Figure are denoted by $\alpha_1$ and $E_1$, respectively. The linear expansion coefficient and the Young's modulus of the waveguide substrate 211 in the optical waveguide element are denoted by $\alpha_2$ and $E_2$, respectively. The linear expansion coefficient and the Young's modulus of the waveguide substrate 212 in the optical waveguide element are denoted by $\alpha_3$ and $E_3$, respectively. The linear expansion coefficient and the Young's modulus of the second compensation substrate 205 are denoted by $\alpha_4$ and $E_4$, respectively. Generally, the optical waveguide layer 211 of the optical waveguide element are very thin compared to the other parts, i.e., the first compensation substrate 204, the silicon substrate 212 and the second compensation substrate 205. That is, the thicknesses h1 to h4 are related as:

$$h_2 \ll h_1, h_3, h_4$$

The linear expansion coefficient $\alpha$ of a substance represents the extent of thermal expansion and contraction of the substance itself, and it is a preamble that the substance is open at the two ends. The stress can be numerically represented by the Young's modulus multiplied by the strain. The higher the Young's modulus, the tensile pressure due to expansion or contraction is the higher. Also, the greater the thicknesses $h_1$ to $h_4$ of the individual substrates or layer, the force, with which the other substrate or the like is pulled or compressed at the time of the expansion or contraction, is the higher.

Before analyzing the structure shown in FIG. 2, with the optical waveguide element 203 sandwiched between the first and second compensation substrates 204 and 205, a structure constituted by the sole optical waveguide element 203, i.e., without presence of the first and second compensation substrates 204 and 205, will be considered. The optical waveguide element 203, as described before, is prepared by forming the optical waveguide layer 211 on the silicon substrate 212. In this specification, the laminate structure obtained by bonding together two layers is referred to as "two-layer laminate".

Figure 3:
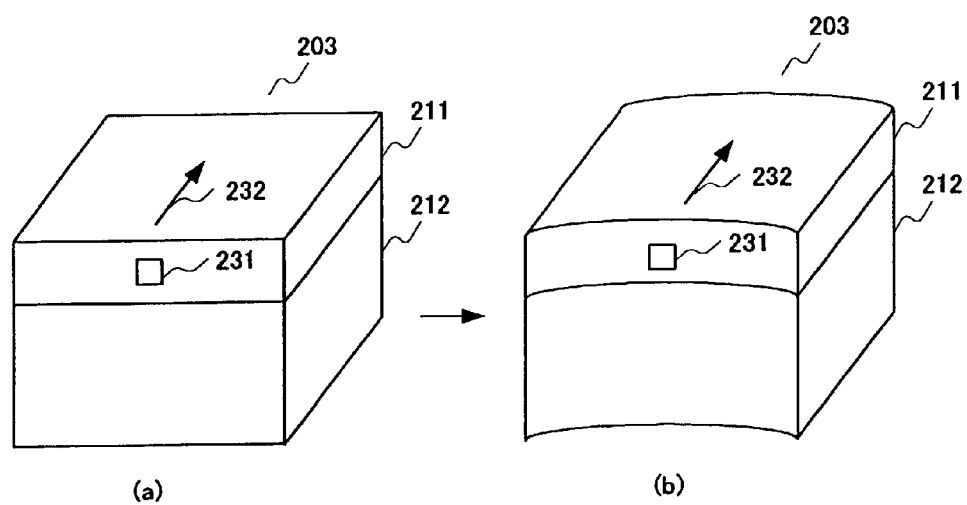
FIGS. 3(a) and 3(b) show the optical waveguide element before the elongation and the optical waveguide element after the elongation.

FIGS. 3(*a*) and 3(*b*) show the optical waveguide element before and after an elongation change in the waveguide direction with a temperature rise. FIG. 3(*a*) shows the optical waveguide element before the elongation, and FIGS. 3(*b*) shows the optical waveguide element after the elongation. In the Figure, reference numeral 231 shows the waveguide position. The waveguide is disposed such as to extend in the optical waveguide layer 211 in the direction of arrow 232. Since the linear expansion coefficients $\alpha_1$ and $\alpha_2$ of the optical waveguide layer 211 and the silicon substrate 212 are different, a temperature change causes the optical waveguide element 203 as a whole to warp as shown in FIG. 3(*b*).

Figure 4:
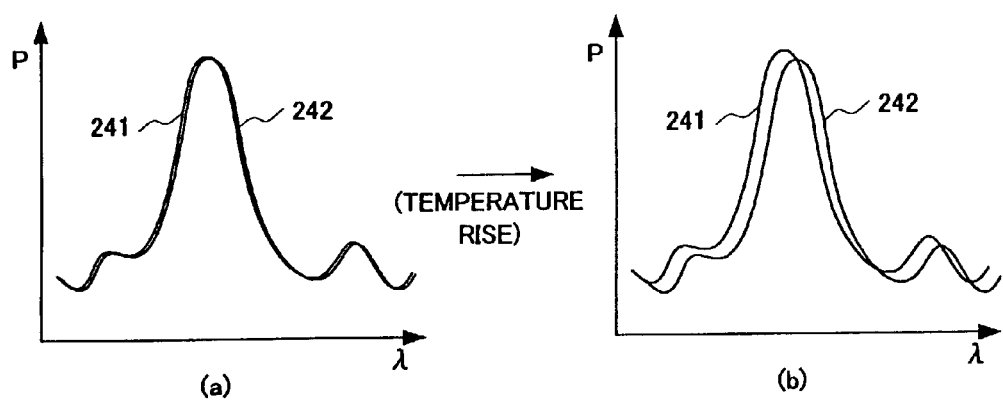
FIGS. 4(a) and 4(b) show displacements of wavelengths of TE and TM polarizations due to such warping generation.

FIGS. 4(*a*) and 4(*b*) show displacements of wavelengths of TE and TM polarizations due to such warping generation. In FIG. 4(*a*), the characteristics 241 and 242 of the TE and TM polarizations are substantially identical. As a result of the warping generation the characteristics 241 and 242 become different from each other as shown in FIG. 4(*b*). For evading or alleviating such temperature dependency, it is usually necessary to prevent warping generation with temperature rise.

In consideration of the structural relation in the optical waveguide element 203 that the optical waveguide layer 211 is formed on the silicon substrate 212, the "two-layer laminate" can assume either one of two converse states, i.e., concave and convex states, as a result of warping at the temperature rise time. Of course in the case of warping in the concave state at the temperature rise time, convex warping results at the temperature fall time, while in the case of warping in the convex state at the temperature fall time concave warping results at the temperature fill time. Now, various cases of warping of the "two-layer laminate" will be considered.

(1) Case of warping of the "two-layer laminate" in the concave state at the temperature rise time:

This case arises when the linear expansion coefficient $\alpha_3$ is greater than the linear expansion coefficient $\alpha_2$ in FIG. 2, and is represented by the following formula (3-1-1).

$$\alpha_2 < \alpha_3 \text{ (with } \alpha_2 > 0) \tag{3-1-1}$$

(2) Case of warping of the "two-layer laminate" in the convex state at the temperature rise time:

This case arises when the linear expansion coefficient $\alpha_2$ is greater than the linear expansion coefficient $\alpha_3$ in FIG. 2, and is represented by the following formula (3-2-1).

$$\alpha_2 > \alpha_3 \text{ (with } \alpha_3 > 0) \tag{3-2-1}$$

(3) Case of non-warping of the "two-layer laminate" at the temperature rise time:

This case arises when the linear expansion coefficients $\alpha_3$ and $\alpha_2$ are equal, and is represented by the following formula (3-3-1).

$$\alpha_2 = \alpha_3 \tag{3-3-1}$$

Now, the structure described above, in which the "two-layer laminate" is sandwiched between the first and second compensation substrates 204 and 205 as shown in FIG. 2, will be considered. Here a case when the temperature dependency of the waveguide type optical device is expanded, will be considered. Like the above case, various cases of warping will be considered.

(4) Case of warping of the "two-layer laminate" in the concave state at the temperature rise time (warping in the convex state at the temperature fall time):

The "two-layer laminate" undergoes warping in the concave state at the temperature rise time under the condition of the following formula (3-4-1).

$$\alpha_2 < \alpha_3 \text{ (with } \alpha_2 > 0) \tag{3-4-1}$$

In the case of disposing the first and second compensation substrates 204 and 205 as shown in FIG. 2 for reducing the elongation and warping of the optical waveguide element 203, it suffices that the linear expansion coefficient of the first compensation substrate 204 is greater than the linear compensation coefficient of the second compensation substrate 205 (formula (3-4-3)). In other words, the linear expansion coefficients of the first and second compensation substrates are set such that the warping thereof is converse to the warping of the optical waveguide element 203. For increasing the linear expansion coefficient of the optical waveguide element, $\alpha_1$ and $\alpha_2$ should have greater values than 3 (formula (3-4-4)).

$$\alpha_1 > \alpha_4 \tag{3-4-3}$$

$$\alpha_1, \alpha_4 > \alpha_3 \tag{3-4-4}$$

Now, other material characteristics of the compensation substrates will be considered. As shown in the following formulas, the greater the Young's modulus E, the rigidity is the greater, and the strain is the less the greater the strain corresponding to the stress and the substrate thickness h. This means that even when the formulas (3-4-4) and (3-4-4) fail to beheld, it is possible to reduce the warping of the optical waveguide element 203 at the temperature rise time if the following formulas (3-4-5) and (3-4-6) are held. When the formulas (3-4-3-), (3-4-4), (3-4-5) and (3-4-6) are all held, the maximum effect can be obtained. However, increasing the differences of the individual inequalities, it is possible to obtain a sufficient effect for reducing the warping even with a less number of formulas to be held.

| $\epsilon = \sigma/E$ | $\epsilon$: strain $\sigma$: bending stress |
| | E: Young's modulus |
| $\sigma = M/Z$ | M: bending moment |
| | Z: section coefficient |
| $Z = 1/6bh^2$ | b: substrate section length |
| | h: substrate section thickness |

$E_4 < E_1$ ($E_2, E_3 < E_1$)(3-4-5)

$$h_4 < h_1 \ (h_2, h_3 < h_1) \tag{3-4-6}$$

(5) Case of Warping of the "two-layer laminate" in the convex state at the temperature rise time (warping to the concave state at the temperature fall time):

The "two-layer laminate" undergoes convex warping at the temperature rise time under the condition of the following formula (3-5-1).

$$\alpha_2 > \alpha_3 \text{ (with } \alpha_2 > 0) \tag{3-5-1}$$

In the case when the first and second compensation substrates 204 and 205 are disposed as shown in FIG. 2 for reducing the elongation and warping of the optical waveguide element 203, it suffices that the linear expansion coefficient of the first compensation substrate 204 is greater than that of the second compensation coefficient 205 (formula (3-5-3)). In other words, the linear expansion coefficients of the first and second compensation substrates are set such that the warping thereof is converse to the warping of the optical waveguide element 203. Also, for increasing the linear expansion coefficient of the optical waveguide element as a whole, it is necessary that $\alpha_1$, and $\alpha_4$ both have values greater than $\alpha_3$. (formula (3-5-4)).

$$\alpha_1 > \alpha_4 \tag{3-5-3}$$

$$\alpha_1, \alpha_4 > \alpha_3 \tag{3-5-4}$$

As for the other compensation substrate materials, it is possible to apply the same concept as in the case (4).

(6) Case When the "two-layer laminate" itself does not undergo warping with a temperature change:

Even when the "two-layer laminate" does not undergo warping with a temperature change, by securing the second compensation substrate 205 as shown in FIG. 2 to the side of the waveguide substrate 212 for supporting the "two-layer laminate", the overall structure experiences a force tending to cause its warping in the convex or concave state even without warping of the optical waveguide element 203 constituting the "two-layer laminate" unless the linear expansion coefficient $\alpha_4$ of the second compensation substrate 205 is equal to the linear expansion coefficients $\alpha_2$ and $\alpha_3$. To prevent this, it is necessary to bond the first compensation substrate 204, which has the same linear expansion coefficient $\alpha_1$ as the linear expansion coefficient $\alpha_4$ of the second compensation substrate 205, to the side of the optical waveguide layer 211.

Now, specific values will be computed with an example of the waveguide type optical device according to the present invention.

The array waveguide diffraction grating 201 shown in FIG. 2 is used as an optical waveguide as a preamble of computation. In this array waveguide diffraction grating 201, the thickness $h_0$ and the linear expansion coefficient of the optical waveguide element 203 are denoted by $t_1$ and $\alpha_0$, respectively. The thicknesses $h_1$ and $h_4$ and the linear expansion coefficients of the first and second compensation substrates 204 and 205 are set to equal values of $t_2$ and $\alpha_1$, respectively. Also, for the brevity of description the Young's modulus of the individual layers are assumed to be equal. In this case, the linear expansion coefficient of the array waveguide diffraction grating 201 as a whole can be represented by the following formula (4).

$$\alpha_{all} = \frac{t_1 \alpha_0 + 2t_2 \alpha_1}{t_1 + 2t_2} \tag{4}$$

Then, the center wavelength $\lambda_0$ preliminarily preset in the formula (1) may be converted to the linear expansion coefficient $\alpha$ by substituting it into the formula (2), and the linear expansion coefficients $\alpha_0$ and $\alpha_1$ and the thicknesses $t_1$ and $t_2$ of the substrates 203 and 204 (205) may be determined from the converted linear expansion coefficient $\alpha$ and the formula (4). The values will be computed in connection with an example, in which the array waveguide diffraction grating 201 is a quartz optical waveguide element formed on an Si substrate.

The thickness and the linear expansion coefficient of the Si substrate as the optical waveguide element 203 are assumed to be 0.8 mm and $26.3 \times 10^{-7}/°$ C., respectively. Also, $dn_{eq}/dT$ in the formula (2) is assumed to be $6.0 \times 10^{-6}$, and the equivalent diffractive index $n_{eq}$ are assumed to be 1.46. Furthermore, the center wavelength $\lambda_0$ is assumed to be 1.55 μm. In this case, 0.02 nm/° C., i.e., double the value in the case of the prior art quartz optical waveguide element, is assumed to be set. From the formula (1), the following formula (5) is held.

$$\frac{1}{L}\frac{dS}{dT} = 2.072 \times 10^{-5} \tag{5}$$

By substituting this into the formula (2), the following formula (6) is obtained.

$$\alpha = 93.7 \times 10^{-7} \tag{6}$$

The thickness $t_2$ of the first and second compensation substrates 204 and 205 bonded one atop the other is assumed to be 1.5 mm.

$$\alpha_1 = 111.7 \times 10^{-7} \tag{7}$$

Thus, it is concluded that a material having such linear expansion coefficient $\alpha_1$ may be used as the first and second compensation substrate 204 and 205.

Now, the manufacture of optical waveguide as an embodiment and waveguide type optical device and waveguide type optical device will be described. First, as an example of the optical waveguide, an array waveguide diffraction grating as shown in FIG. 1 was produced. As preamble, like those shown in FIG. 2, the thickness and the linear expansion coefficient of the optical waveguide element 203 in the array waveguide diffraction grating 201 were set to h0 and $\alpha_0$, respectively. Also, the thicknesses $h_1$ and $h_4$ and the linear expansion coefficients of the first and second compensation substrates 204 and 205 were set to equal values of $t_1$ and $\alpha_1$, respectively. As the first and second compensation substrates 204 and 205 temperature-dependent characteristic AEWGs (array waveguide diffraction gratings) are produced by using glass ceramics. The linear expansion coefficient $\alpha_1$ and the thickness $t_2$ of the first and second compensation substrates 204 and 205 were $130 \times 10^{-7}/°$ C. and 1 mm, respectively.

The linear expansion coefficient α0 and the thickness t1 of the optical waveguide element 203 were 26.3×10−7/° C. and 0.8 mm, respectively.

Using the formula (4), the linear expansion coefficient $\alpha_{all}$ of the array waveguide diffraction grating 201 as a whole is 100.37×10$^{-7}$/° C. The center wavelength temperature dependency can be obtained by substituting this value into the formulas (1) and (2).

In the array waveguide diffraction grating 201 in this embodiment, the temperature dependency is increased compared to the case free from the substrates 204 and 205 due to the effects of the first and second substrates 204 and 205. It is thus possible to set the center wavelength of the array waveguide diffraction grating 201 to be in a desired range by temperature adjustment with the temperature controller added to the first or second compensation substrate 204 or 205. Beside, in this embodiment by using the first and second compensation substrates 204 and 205 it is possible to reduce the effects of warping of the array waveguide diffraction grating 201 as a whole.

Figure 5:
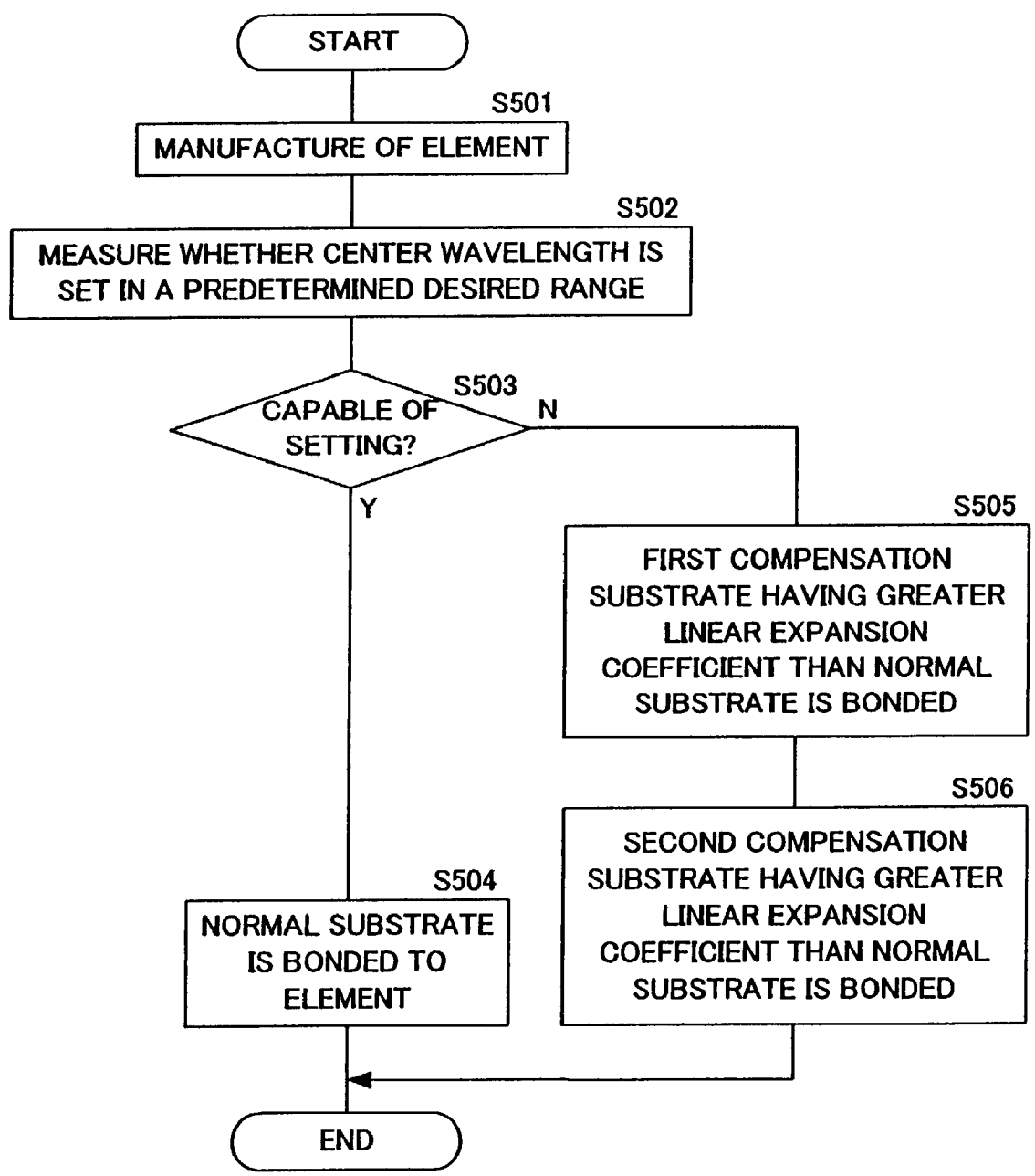
FIG. 5 shows the summary of the process of manufacturing the array waveguide diffraction element in the embodiment.

FIG. 5 shows the summary of the process of manufacturing the array waveguide diffraction element in the embodiment. The optical waveguide element 203 shown in FIG. 1 is manufactured by using a wafer (not shown) (step S501). Then, a measurement is made as to whether it is possible to set the center wavelength to be in a predetermined desired range in the working temperature range of a temperature controller (not shown), in which the optical waveguide element 203 is mounted on the substrate side thereof (step S502). The temperature range of the temperature controller can be set in a range of, for instance, 75 to 85° C. With a optical waveguide element 203 which has been capable of setting the center wavelength in such temperature range ("" in step S503), like the prior art, a normal substrate is bonded to the substrate side (step S504), thus obtaining the array waveguide diffraction circuit.

With a optical waveguide element 203 which has been incapable of setting the center wavelength in such temperature range ("N" in step S503), heretofore the wavelength element 203 itself was discarded. In this embodiment, a predetermined first compensation substrate 204 having a greater linear expansion coefficient than the normal substrate is bonded with highly rigid adhesive to the waveguide side of the optical waveguide element 203 (step S505). Then, a predetermined second compensation substrate 20 having a greater linear expansion coefficient than the normal substrate is bonded with the same highly rigid adhesive to the substrate side of the optical waveguide element 203 (step S506). The array waveguide diffraction grating 201 manufactured in this way, permits center wavelength setting to a desired value in the working temperature range of the temperature controller, and thus it can be shipped as a product likewise.

In this manufacturing process, the steps S505 and S506 may be conversed in order, or it is also possible to make simultaneous bonding.

First Modification of the Embodiment

Figure 6:
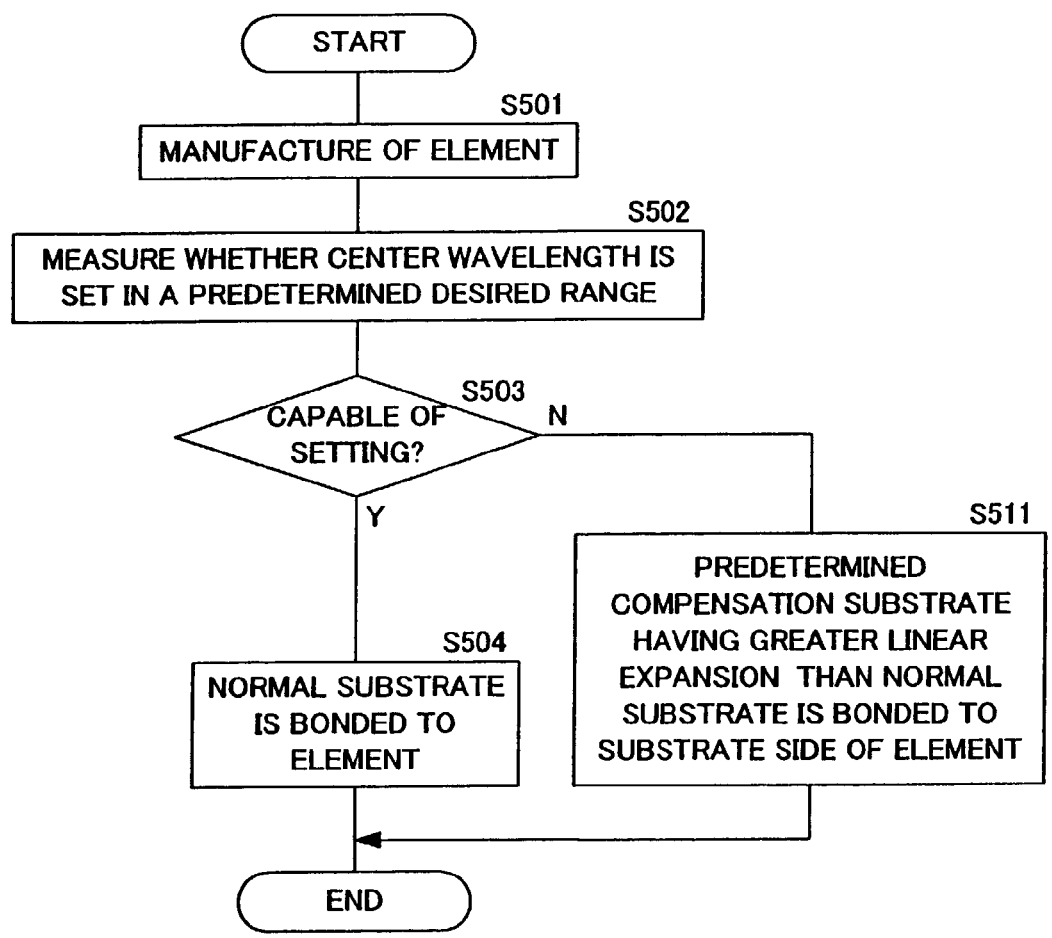
FIG. 6 shows a first modification of the process of preparing the array waveguide diffraction grating.

FIG. 6 shows a first modification of the process of preparing the array waveguide diffraction grating. In this modification, steps like those in FIG. 5 are designated by like reference numerals, and their description is adequately omitted.

In this first modification, a predetermined compensation substrate having a greater linear expansion coefficient than the normal substrate is bonded to only the substrate side of the optical waveguide elements 203, which have failed in the center wavelength setting in a predetermined desired range in the step S503 (step S511). In this way as well, it is possible to set the center wavelength to a desired value in the working temperature range of a temperature controller (not shown).

Second Modification of the Embodiment

Figure 7:
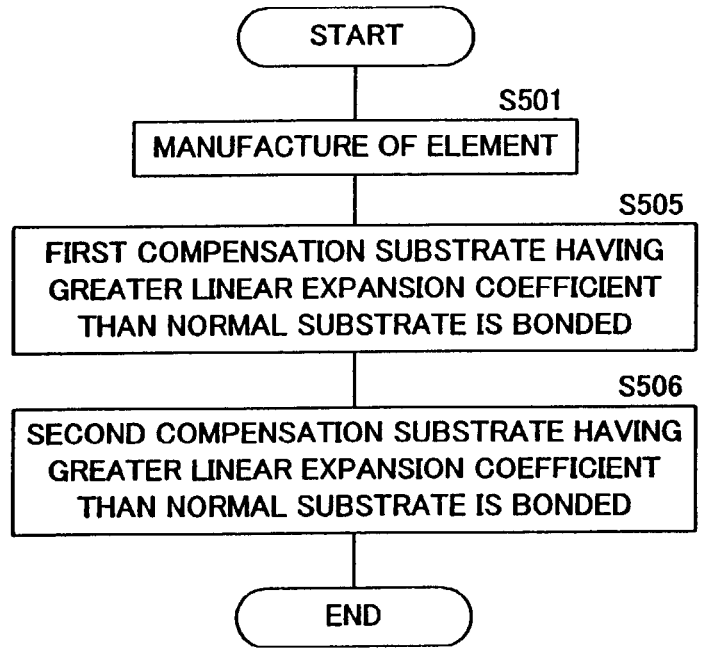
FIG. 7 shows a second modification of the process of preparing the array waveguide diffraction grating.

FIG. 7 shows a second modification of the process of preparing the array waveguide diffraction grating. In this modification, steps like those in FIG. 5 are designated by like reference numerals, and their description is adequately omitted.

In this modification, right after preparation of the optical waveguide element 203 shown in FIG. 1 by using a wafer (not shown) (step S501), a step S505 is executed, in which a predetermined first compensation substrate 204 having a greater linear expansion coefficient than the normal substrate is bonded with highly rigid adhesive to the waveguide side of the optical waveguide element 203. Then, a predetermined second compensation substrate 205 having greater linear expansion coefficient than the normal substrate is bonded with the same highly rigid adhesive to the substrate side of the optical waveguide element 203 (step S506). Like the previous embodiment, the steps S505 and S506 may be conversed in order, or may be executed as a single step.

As shown, in this second modification the first and second compensation substrates 204 and 205 are selected such as to cover the maximum characteristic range of the individual optical waveguide elements 203 prepared. It is thus adapted that the center wavelength is set to a desired value without preparation of the temperature controller. In this case, the first and second compensation substrates 204 and 205 are disposed on all optical waveguide elements 203. However, the preparation process is uniformalized, and the compensation substrates 204 and 205 are disposed on both sides of the optical waveguide element 203, and it is thus possible to obtain an advantage that the array waveguide diffraction grating 201 is less broken and can be more readily handled.

Third Modification of the Embodiment

Figure 8:
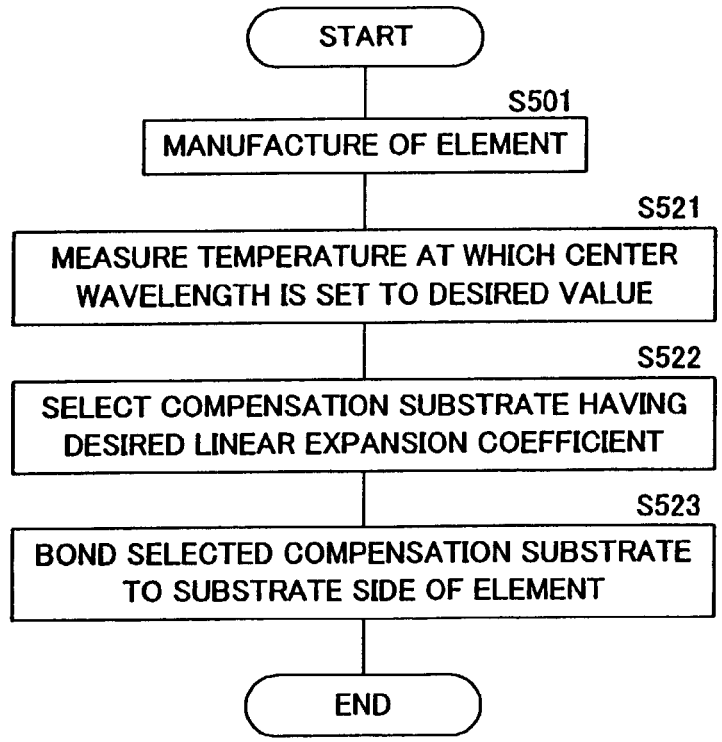
FIG. 8 shows a third modification of the process of preparing the array waveguide diffraction grating.

FIG. 8 shows a third modification of the process of preparing the array waveguide diffraction grating. Again in this modification, steps like those in FIG. 5 are designated by like reference numerals.

In this third modification, after preparation of the optical waveguide element 203 by using a wafer (not shown) (step S501), the temperature of the optical waveguide element 203 thus prepared, at which the center wavelength is set to a desired value, is measured (step S521). On the basis of this temperature, a compensation substrate having a desired linear expansion coefficient is selected among preliminarily prepared compensation substrates having various linear expansion coefficients (step S522). This compensation substrate is bonded with highly rigid adhesive to the substrate side of the optical waveguide element 203 (step S523).

Fourth Modification of the Embodiment

Figure 9:
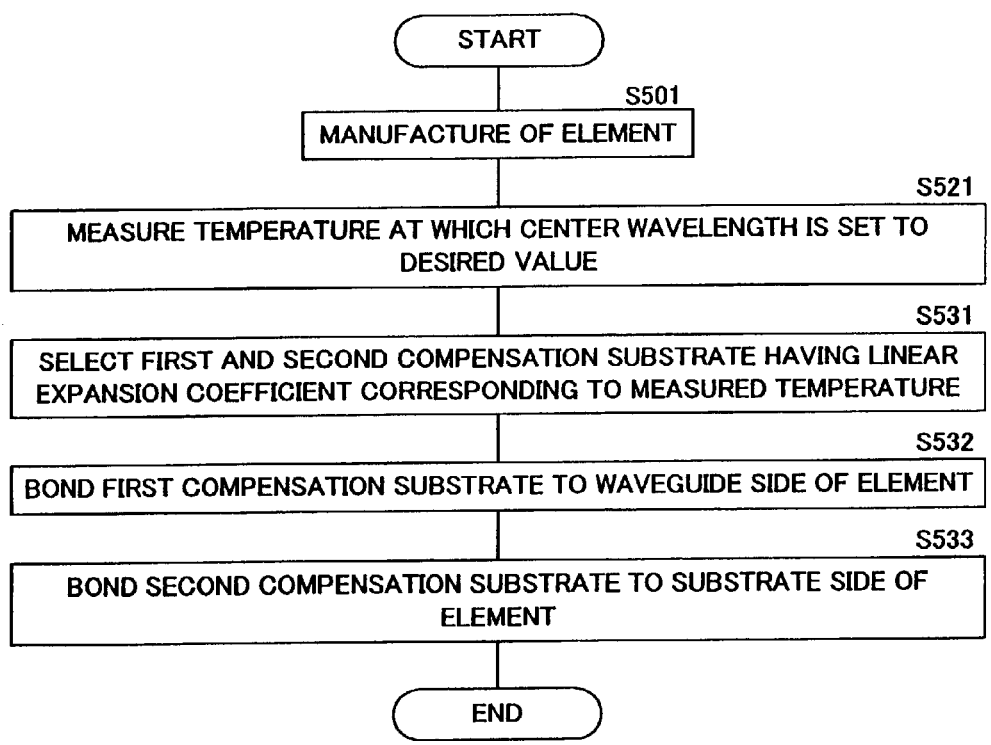
FIG. 9 shows a fourth modification of the process of preparing the array waveguide diffraction grating.

FIG. 9 shows a fourth modification of the process of preparing the array waveguide diffraction grating. Again in this modification, steps like those in FIG. 8 are designated by like reference numerals, and their description is adequately omitted.

In this fourth modification, after the temperature measurement in the step S521, paired first and second compensation substrates 204 and 205 having linear expansion coefficients corresponding to the measured temperature are selected (step S531). Then, the selected first compensation substrate 204 is bonded with highly rigid adhesive to the waveguide side of the optical waveguide element 203 (step S532), and then the selected second compensation substrate 205 is bonded with highly rigid adhesive to the substrate side of the optical waveguide element 203 (step S533). The steps S532 and S533 may be conversed in order, or they may of course be executed as a single step.

While the above embodiment and modifications have been described in connection with the array waveguide diffraction gratings 201 and 401, the present invention is of course applicable to other optical waveguide elements such as Machzender interferometer.

As has been described in the foregoing, according to the first and second aspects of the present invention, on the substrate side of the planar lightwave circuit the support substrate having the greater linear expansion coefficient than that of the substrate in the optical waveguide element is disposed, and the temperature of the support substrate and the optical waveguide element is controlled with the temperature controller assembled in the support substrate. The support substrate thus causes expansion and elongation on the optical waveguide element such as to substantially increase the linear expansion coefficient of the optical waveguide element. It is thus possible to increase the ratio of waveguide type optical devices capable of obtaining the desired center wavelength by merely considering the linear expansion coefficient of the support substrate, thus improving the yield.

According to the third to ninth aspects of the present invention, the first and second substrates having linear expansion coefficients greater than that of the planar lightwave circuit are disposed to sandwich the optical waveguide element. It is thus possible to substantially increase the linear expansion coefficient of the optical waveguide element and improve the yield of product. Furthermore, since the optical waveguide element is sandwiched between the first and second substrates, the mechanical shock resistance is increased. Furthermore, by adequately setting the linear expansion coefficients of the first and second substrates, it is possible to prevent or reduce warping due to changes in the temperature of the waveguide optical device itself, and no adverse effects are given on characteristics other tan the temperature characteristic of the center wavelength.

According to the sixth aspect of the present invention, the thickness of the first substrate is made to be equal or less than the reinforcement glass 209, thus permitting the thickness increase of the overall structure.

According to the seventh aspect of the present invention, the support substrate and the temperature controller are substantially equal in thickness, and it is thus possible to increase the thickness of the waveguide type optical device itself.

According to the eighth aspect of the present invention, the second substrate and the temperature controller are substantially equal in thickness, and it is possible to prevent increase the thickness of the waveguide type optical device.

According to the ninth aspect of the present invention, in the waveguide type optical device according to the third aspect, the first and second substrates are equal in thickness and linear expansion coefficient. Thus, it is possible to provide common specifications for these parts and realize cost-down and readier parts management.

According to the tenth or twelfth aspect of the present invention, the optical waveguide element is prepared in the usual manner, and as for the optical waveguide element judged in the checking step to be out of standards, a support substrate having a predetermined linear expansion coefficient greater than that of the substrate of the optical waveguide element is bonded in the normal substrate bonding step. It is thus possible to reduce adverse effects on the process of manufacture and preclude the generation of rejected parts as much as possible.

According to the tenth or twelfth aspect of the present invention, the optical waveguide element is prepared in the usual manner, and then without execution of any checking step a support substrate having a predetermined linear expansion coefficient greater than that of the substrate of the optical waveguide element is bonded to the substrate side of the optical wave guide element. Thus, it is possible to reduce the number of steps of manufacture. Also, as for optical waveguide elements which were heretofore rejected due to substantial linear expansion coefficient increase, it is possible to set a desired center wavelength in less temperature range.

According to the thirteenth aspect the present invention, the optical waveguide element is prepared in the usual way, and as for optical waveguide elements judged in the checking step to be out of standards, a first and a second substrate having a predetermined linear expansion coefficient greater than that of the substrate of the optical waveguide element are bonded in the normal substrate bonding step. Thus, it is possible to reduce adverse effects on process of manufacture and reduce generation of rejected parts as much as possible.

According to the fourteenth aspect the present invention, the optical waveguide element is prepared in the usual manner, and subsequently a first and a second substrates having a greater linear expansion coefficient are bonded to the prepared optical wave guide element. Thus, it is possible to reduce adverse effect on the process of manufacture and preclude the generation of rejected parts as much as possible. Furthermore, since the first and second substrates are bonded such as to sandwich the optical waveguide element, it is possible to increase the mechanical shock resistance.

According to the fifteenth aspect of the present invention, in the method of manufacturing the waveguide type optical device in the thirteenth or fourteenth aspect, the first and second substrates are set such that they are equal in thickness and linear expansion coefficient. Thus, it is possible to provide common specifications for the first and second substrates and realize cost-down and readier parts management.

According to the sixteenth aspect of the present invention, after preparation of the optical waveguide element in the element preparation step, the temperature, at which the center wavelength of the prepared optical waveguide element is set to a desired value, is measured in a temperature measuring step, and on the basis of the measured temperature the extent, by which the linear expansion coefficient of the support substrate bonded to the substrate side of the optical waveguide element is greater than the linear expansion coefficient, is selected in the support substrate linear expansion coefficient selecting step. It is thus possible to select the most adequate support substrate form various standpoints such as saving of consumed power.

According to the seventeenth aspect of the present invention, after preparation of the optical waveguide element in the element preparation step, the temperature, at which the center wavelength of the prepared optical waveguide element is set to a desired value is measured in a temperature measuring step, and on the basis of the measured temperature the extent, by which the linear expansion coefficient of both the first and second substrates to be bonded to the waveguide side and the substrate side, respectively, of the optical waveguide element is made to be greater than that of the substrate of the optical waveguide element, is selected in the first/second substrate linear expansion coefficient selecting step for bonding the first and second substrates having the selected linear expansion coefficient to corresponding parts of the optical waveguide element. It is thus possible to prepare a plurality of first and second substrates having different linear expansion coefficients and select the most adequate support substrate from various standpoints such as saving of consumed power.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. An optical waveguide device comprising:
   an optical waveguide element;
   a first compensation substrate having a linear expansion coefficient greater than that of the optical waveguide element and disposed on a first side of the optical waveguide element;
   a second compensation substrate disposed on a second side of the optical waveguide element opposite the first side and having a linear expansion coefficient greater than that of the optical waveguide element; and
   a temperature controller thermally coupled to the second compensation substrate for controlling a temperature of the optical waveguide element.

2. The optical waveguide device according to claim 1, wherein the optical waveguide element is bonded to the first and second compensation substrates by highly rigid adhesive.

3. The optical waveguide device according to claim 1, wherein the second compensation substrate and the temperature controller are substantially equal in thickness.

4. The optical waveguide device according to claim 1, wherein:
   the optical waveguide element comprises a substrate and an optical wavelength pattern disposed on a surface of the substrate between the substrate and the first compensation substrate; and
   wherein the first and second compensation substrates have thermal expansion coefficients greater than that of the substrate of the optical waveguide element.

5. The optical waveguide device according to claim 1, further comprising:
   a fiber array optically coupled to the optical waveguide element; and
   reinforcement glass disposed on the waveguide side of the optical waveguide element and serving to reinforce the bonding strength of the fiber array.

6. The optical waveguide device according to claim 5, wherein the first compensation substrate comprising a thickness equal to or less than a thickness of the reinforcement glass.

7. The optical waveguide device according to claim 1, wherein the first and second compensation substrate and the temperature equal in thickness.

8. The optical waveguide device according to claim 1, wherein the first and second compensation substrates have substantially equal linear expansion coefficients.

9. An optical waveguide device comprising:
   an optical waveguide element;
   a first substrate disposed on a waveguide side of the optical waveguide element and having a linear expansion coefficient greater than that of the optical waveguide element; and
   a second substrate disposed on a side opposite the waveguide side of the optical waveguide element, provided with a temperature controller for adjusting the temperature of the optical waveguide element and having a linear expansion coefficient greater than that of the optical waveguide element.

10. The optical waveguide device according to claim 9, wherein a first adhesive used for bonding the first substrate to the waveguide side of the optical waveguide element and a second adhesive used for bonding the second substrate to the side opposite the waveguide side of the optical waveguide element are highly rigid.

11. The optical waveguide device according to claim 10, wherein the linear expansion coefficient of the first substrate is selected to a value such as to reduce the warping of the whole structure, obtained by disposing the second substrate to the side opposite the waveguide side of the optical waveguide element, with temperature changes.

12. The optical waveguide device according to claim 9, further comprising:
   a fiber array optically coupled to the optical waveguide element; and
   reinforcement glass disposed on the waveguide side of the optical waveguide element and serving to reinforce the bonding strength of the fiber array;
   the first substrate having a thickness equal to or less than the thickness of the reinforcement glass.

13. The optical waveguide device according to claim 1, wherein the second substrate and the temperature controller are substantially equal in thickness.

14. The optical waveguide device according to claim 9, wherein the first and second substrates are substantially equal in thickness and linear expansion coefficient.

* * * * *